Mar. 6, 1923. 1,447,386
S. B. HASELTINE
ANTIFRICTION BEARING AND PROCESS OF MAKING SAME
Filed Jan. 14, 1921
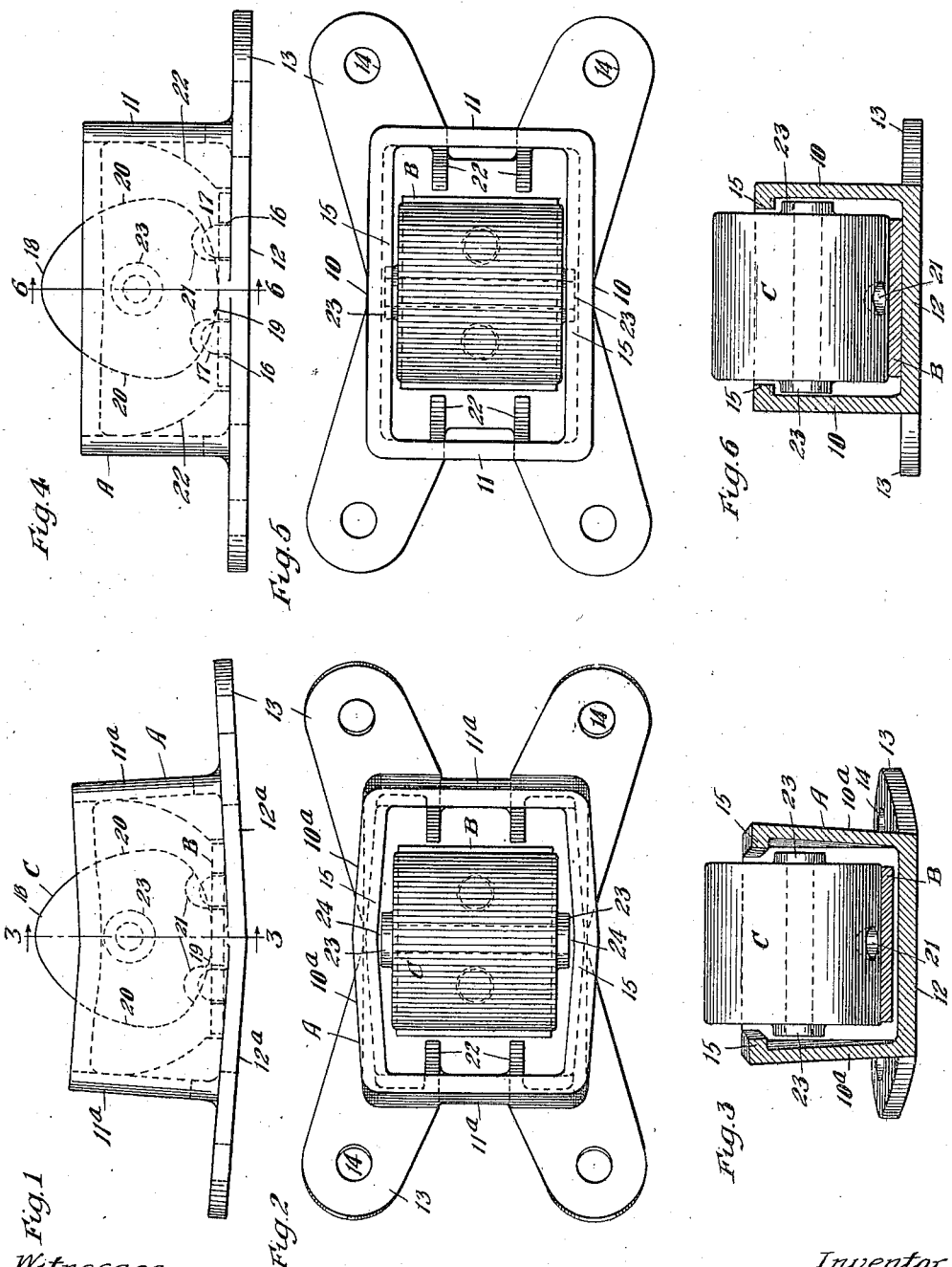

Patented Mar. 6, 1923.

1,447,386

UNITED STATES PATENT OFFICE.

STACY B. HASELTINE, OF CHICAGO, ILLINOIS, ASSIGNOR TO WILLIAM H. MINER, OF CHAZY, NEW YORK.

ANTIFRICTION BEARING AND PROCESS OF MAKING SAME.

Application filed January 14, 1921. Serial No. 437,317.

*To all whom it may concern:*

Be it known that I, STACY B. HASELTINE, a citizen of the United States, residing at Chicago, in the county of Cook and State of Illinois, have invented a certain new and useful Improvement in Antifriction Bearings and Processes of Making Same, of which the following is a full, clear, concise, and exact description, reference being had to the accompanying drawings, forming a part of this specification.

This invention relates to improvements in anti-friction bearings and process of making same.

One object of the invention is to provide an anti-friction bearing consisting of few parts and so arranged that the same cannot become disassembled or the proper relation of the parts accidentally disarranged or tampered with after the parts have been properly assembled.

Another object of the invention is to provide an improved process of making an anti-friction bearing possessing the characteristics indicated in the preceding paragraph.

More specifically, the object of the invention is to provide an anti-friction bearing adaptable for use as a railway side bearing and process of making the same.

In the drawing forming a part of this specification, Figure 1 is a side elevation of an anti-friction bearing of the side bearing type showing the arrangement of parts as initially assembled in their original manufactured form. Figure 2 is a top plan view of the structure illustrated in Figure 1. Figure 3 is a vertical transverse section corresponding to the line 3—3 of Figure 1. And Figures 4, 5 and 6 are views corresponding respectively to Figures 1, 2 and 3, but illustrating the side bearing in its final or completed form ready for application to a car, the section of Figure 6 corresponding to the section line 6—6 of Figure 4.

In said drawing, the side bearing is shown as comprising, broadly, a retaining member or base casting A; a wear plate B; and an anti-friction element C.

In its final or completed form, the retaining member or base casting A is of hollow box-like form having parallel vertically extending side walls 10—10, end walls 11—11, bottom wall 12, and corner flanges 13 perforated as indicated at 14 so that the same may be secured by rivets or other suitable fastening devices to a bolster of a car. Each of said side walls 10 is provided along its upper edge with an inturned flange 15 as best indicated in Figure 6.

The wear plate B is preferably of steel and consists merely of a flat piece of rectangular form, the same being perforated as indicated at 16—16 so as to adapt said plate to be seated over and held in position by a plurality of correspondingly located lugs or teeth 17—17 preferably cast integral with the retaining member A, said teeth 17 projecting above the upper surface of the plate B, as clearly shown in Figures 1 and 4.

The anti-friction element C, as shown, is of the gravity self-centering type and has upper and lower concentric bearing surfaces 18 and 19 struck on different radii. The upper and lower surfaces 18 and 19 are merged into side surfaces 20—20, the element C being generally of triangular cross section so as to have the greater mass thereof at the bottom below the rolling center. In the bottom, the element C is formed with a plurality of notches 21—21 so located as to cooperate with the teeth 17 and thereby prevent bodily displacement of the element C with respect to the retaining member A while at the same time permitting the necessary rolling movement to either side of normal position. The retaining member A may be provided on its interior at each end with curved edge flanges 22—22 so conformed and located as to fit the curved sides 20 of the element C and limit the movement of the latter in either direction. The element C is further provided with preferably integral studs 23—23 at its opposite ends alined or concentric with the rolling center or axis of the element C. As clearly shown in Figure 6, said studs 23 extend under the flanges 15 but are slightly spaced from the latter thereby permitting the rolling movement of the element C, at the same time preventing withdrawal of the element C from the retaining member A.

In carrying out my invention, the member A will preferably be made in the form of a malleable casting and, as originally cast, will coincide with the conformation illustrated in Figures 1, 2 and 3. As shown in said Figures 1, 2 and 3, it will be noted that the bottom is oppositely bent upwardly from the center of the member A as indicated at 12ª—12ª and the end walls will be upwardly converged as indicated at 11ª—11ª. The side walls are diverged from the ends of the center of the retaining member A, as indicated at 10ª—10ª, so as to leave the maximum opening as indicated at 24 at the center of the member A. The maximum width between the side walls 10ª—10ª at the center of the retaining member will be made slightly greater than the over-all distance from outer face to outer face of the two studs 23—23 so that the anti-friction element C may be readily inserted from the top of the retaining member A when the latter is in its original form, as clearly illustrated in Figures 2 and 3.

With the parts as shown in Figures 1, 2 and 3, the bearing is assembled by first placing the plate B within the retaining member A and then the anti-friction element therewithin. After thus assembled, pressure is applied to the retaining member A so as to deform the latter to its final condition shown in Figures 4, 5 and 6, during which process the bottom wall of the retaining member will be flattened out, the end walls will be rendered vertically parallel and the side walls will be drawn in at their centers so as to bring the flanges 15 into overhanging relation with respect to the studs 23.

With the side bearing made and constructed as above described, it is evident that the anti-friction element C cannot be removed or disassembled from the retaining member A nor can the relative operative positions of the anti-friction element C, plate B, and retaining member A be disarranged or tampered with so that the manufacturer, in shipping the device, may be sure that the bearing will reach its destination and be properly applied.

I have herein shown and described what I now consider the preferred manner of carrying out the invention but I am aware that various changes and modifications may be made in the details of construction and the steps in the process of manufacture without departing from the spirit of the invention and all such changes and modifications are contemplated that come within the scope of the claims appended hereto.

I claim:

1. In an anti-friction bearing, the combination with an anti-friction element adapted to roll bodily back and forth when actuated, said element having studs extended from its opposite ends; of a hollow box-like retaining member within which said element is disposed, said element having side walls provided with inturned flanges along their upper edges overhanging said studs, said side walls being deformed inwardly from their original condition to dispose the previously formed flanges into overhanging relation to said studs.

2. In a side bearing for railway cars, the combination with a gravity self-centering anti-friction element adapted to roll bodily back and forth, said element having integrally formed studs at its ends concentric with the rolling center of said element; of a hollow box-like retaining member adapted to be secured to a bolster, said retaining member having integral end walls, integral bearing wall and integral opposed side walls, the latter having integrally formed inturned continuous flanges along their top edges, spaced apart a distance slightly greater than the axial dimension of the body of said element but less than the over-all distance from end face to end face of said studs whereby removal of said element from said retaining member is positively prevented.

3. The herein described process of making an anti-friction bearing, which includes the following steps; making an anti-friction element adapted for rolling movement and providing the same with studs extending from the opposite ends; making a hollow retaining member within which said element is adapted to be received, said retaining member as originally formed, being provided with inwardly projecting means, initially so disposed as to permit insertion of said element with its studs past said means within said retaining member; and finally deforming said retaining member to displace said inwardly projecting means into overhanging relation to one of said studs and thereby preventing disassembling of said element and said member.

4. The herein described process of making an anti-friction element adapted for rolling movement and providing the same with studs extending from the opposite ends; making an anti-friction element adapted for rolling movement and providing the same with studs extending from the opposite ends; making a hollow retaining member within which said element is adapted to be received, said retaining member, as originally formed, having side walls provided with inturned flanges along the upper edges, initially so disposed as to permit insertion of said element with its studs past said flanges within said retaining member; and finally deforming said walls inwardly, thereby displacing said flanges into overhanging relation to said studs and preventing disassembling of said element and said member.

5. In a side bearing for railway cars, the combination with a gravity self-centering anti-friction element adapted to roll bodily back and forth, said element having integrally formed studs at its ends concentric with the rolling center of said element; of a hollow box-like retaining member adapted to be secured to a bolster, said retaining member having integrally opposed side walls, the latter being recessed to receive the studs and providing continuous shoulders located between the studs and the free edges of the said walls, side shoulders being transversely spaced apart a distance slightly greater than the axial dimension of the body of said element, but less than the overall distance from end face to end face of said studs, whereby removal of said element from said retaining member is positively prevented.

In witness that I claim the foregoing I have hereunto subscribed my name this 29th day of Dec. 1920.

STACY B. HASELTINE.

Witnesses:
CARRIE GAILING,
UNA C. PERIN.